US008042988B2

(12) United States Patent
Ding et al.

(10) Patent No.: US 8,042,988 B2
(45) Date of Patent: Oct. 25, 2011

(54) HOLE-JETTING TYPE MIXER-REACTOR

(75) Inventors: Jiansheng Ding, Yantai (CN); Wanhong Yang, Yantai (CN); Peicheng Luo, Yantai (CN); Weiqi Hua, Yantai (CN); Deqiang Ma, Yantai (CN); Haiquan Xu, Yantai (CN); Ge Zhang, Yantai (CN); Qingle Hou, Yantai (CN); Dezhen Sun, Yantai (CN); Tianjie Yu, Yantai (CN); Yu Yao, Yantai (CN); Nan Zhao, Yantai (CN); Hongbo Li, Yantai (CN)

(73) Assignee: Ningbo Wanhua Polyurethanes Co. Ltd., Ningbo, Zhejiang (CN)

( * ) Notice: Subject to any disclaimer, the term of this patent is extended or adjusted under 35 U.S.C. 154(b) by 896 days.

(21) Appl. No.: 11/872,982

(22) Filed: Oct. 16, 2007

(65) Prior Publication Data

US 2008/0159065 A1     Jul. 3, 2008

(30) Foreign Application Priority Data

Dec. 27, 2006   (CN) .......................... 2006 1 0168394

(51) Int. Cl.
*B01F 5/08* (2006.01)

(52) U.S. Cl. .................................. 366/167.1; 366/173.2

(58) Field of Classification Search ............... 366/167.1, 366/165.1, 165.2, 165.4, 165.5, 173.1
See application file for complete search history.

(56) References Cited

U.S. PATENT DOCUMENTS

| | | | | |
|---|---|---|---|---|
| 2,307,509 A * | 1/1943 | Joachim et al. | ............ | 366/178.2 |
| 3,226,410 A * | 12/1965 | Hettich et al. | ................ | 560/347 |
| 4,886,369 A * | 12/1989 | Hankison | ................... | 366/165.5 |
| 5,117,048 A * | 5/1992 | Zaby et al. | ..................... | 560/347 |
| 5,380,088 A | 1/1995 | Fleischli et al. | ............... | 366/174 |
| 6,930,199 B2 | 8/2005 | Meyn et al. | ..................... | 560/347 |
| 7,033,069 B2 * | 4/2006 | Danielsson et al. | ........ | 366/173.1 |
| 2008/0159065 A1 * | 7/2008 | Ding et al. | .................. | 366/162.4 |

FOREIGN PATENT DOCUMENTS

| | | |
|---|---|---|
| CN | 1304927 A | 7/2001 |
| CN | 1468651 A | 1/2004 |
| CN | 1636972 A | 7/2005 |
| GB | 485656 | 12/1935 |

* cited by examiner

*Primary Examiner* — Tony G Soohoo

(74) *Attorney, Agent, or Firm* — Ohlandt, Greeley, Ruggiero & Perle, L.L.P.

(57) ABSTRACT

A hole-jetting type mixer-reactor, comprises the following parts: a first feeding port, a second feeding port, an outer casing, an inner casing, jet holes and a mixing reaction zone. The inner casing is inside the outer casing, and the lower portion of the outer casing forms a buffer chamber with the inner casing. The first feeding port connects with the inner casing to constitute one flow channel, and the second feeding port connects with the buffer chamber to form the other flow channel. The jet holes are on the wall of the inner casing situated at lower portion of the buffer chamber. The mixing reaction zone is inside the inner casing below the jet holes. The cross section of the inner casing is rectangular or rectangle-like. The mixer-reactor can achieve a fast mixing of two reactant streams which reacts with instantaneous, complicated parallel or consecutive competing reactions. The time scale of the mixing process is several milliseconds.

6 Claims, 4 Drawing Sheets

HOLE-JETTING TYPE MIXER-REACTOR

CROSS-REFERENCE TO RELATED APPLICATIONS

This application is related to, and claims priority in, Chinese Patent Application No. 200610168394.7, filed on Dec. 27, 2006, the disclosure of which is incorporated in its entirety by reference herein.

TECHNICAL FIELD

The present invention relates to a mixer-reactor, in particular, to a hole-jetting type mixer-reactor capable of fast mixing of raw materials during the production of certain chemical products in large scale.

BACKGROUND OF THE INVENTION

In some chemical processes with parallel-competing reactions or consecutive-competing reactions, the reaction products or intermediate may further react with raw material component(s), which produces undesirable by-products or impurities. In this case, the initial mixing of reactants has a significant impact on the yields and selectivity of the target products, i.e. the distribution of the products, especially when the mixing rate of the reactants is less than or similar to the chemical reaction rates. Meanwhile some other indexes of the process, such as the energy consumption, will be affected by the mixing efficiency of the reactants. So the reactor with fast mixing efficiency should be considered in the design of the whole process. For example, in the production of isocyanates (MDI or TDI) by phosgenation of amines, the process mainly includes so-called cold phosgenation stage and hot phosgenation stage. At the cold phosgenation stage, mono- or polyamines and phosgene are dissolved in an inert solvent, respectively, such as chlorobenzene, dichlorobenzene, toluene, chlorinated naphthalene, or 1,2,4-trichlorobenzene, etc., and then reacted at a lower temperature in the range of 0-90° C. At this stage, main products or intermediate products include carbamyl chloride (RNHCOCl), amine hydrochloride ($RNH_2.HCl$), and a small amount of urea. The main reactions are as follows:

$$RNH_2 + COCl_2 \rightarrow RNHCOCl + HCl \quad (1)$$

$$RNH_2 + HCl \rightarrow RNH_2.HCl \quad (2)$$

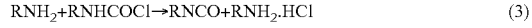

$$RNH_2 + RNHCOCl \rightarrow RNCO + RNH_2.HCl \quad (3)$$

$$RNH_2 + RNCO \rightarrow RNHCONHR \quad (4)$$

At the cold phosgenation stage, the mono- or polyamines firstly react with phosgene, as shown in reaction (1), producing carbamyl chloride and hydrochloric acid. Reaction (1) is an exothermic reaction with fast reaction rates. Meanwhile, HCl produced from reaction (1) conducts a fast reaction (2) with the mono- or polyamines giving amines hydrochloride. The carbamyl chloride and amine hydrochloride are insoluble substances in the solvent and appears in the solid formulation. When the micro-mixing efficiency of phosgene and amines is lower, that is, the amines is excessive to the phosgene in some zone of the reactor, the excessive amines will react with carbamyl chloride or isocyanates through reactions (3) and (4), producing the byproduct of urea which is a sticky substance insoluble in the reaction system and can plug the reactor. This process involves complicated consecutive-competing reaction, in which the main reaction occurs instantaneously with reaction times of several milliseconds or less, and its products can further conduct a fast reaction with the raw material reactants to produce the insoluble byproducts. Therefore, the initial mixing efficiency of the two reactants will have great effect on the yield and selectivity of the target product. So it is necessary to design a mixer-reactor which can achieve the fast mixing of liquid reactants, increase the yields and selectivity of the target products, and reduce the yield of the sticky byproduct.

Fast mixing of fluid could be facilitated by the impingement of two cross-flow streams. One example is, one fluid stream is injected into another fluid stream crossly through a plurality of small holes. So the stream through the holes is split into many small streams which are injected into the other stream and then surrounded by the main stream rapidly, giving the fast mixing of the two streams.

U.S. Pat. No. 3,226,410 discloses a process for the manufacture of isocyanates, wherein the mixer-reactor for the phosgenation of amines is a hole-jetting type tubular reactor (as shown in FIG. 1), in which amines solutions are injected into phosgene streams crossly through small holes on the pipe wall so that fast mixing of the reactants could be achieved. However, the detailed structure of the tubular reactor has not been described in the patent. It only covers the range of the flowing parameters of the two streams, viz. the Reynolds number that is not less than 2100. Furthermore, since the mixer-reactor disclosed in the patent can not achieve the fast mixing of the reactants in large scale, more solvent and phosgene should be used to reduce the undesirable byproducts, which would increase the energy consumption for the recovering of the solvent and phosgene.

Bayer's U.S. Pat. No. 5,117,048 discloses another hole-jetting type mixer-reactor (as shown in FIG. 2) for the production of isocyanates, in which one fluid stream (mono- or polyamines) is injected into the other stream (phosgene) crossly through the holes arranged on the neck of the reactor at the same horizontal line to achieve the fast mixing of two reactant streams. This good mixing efficiency benefits from the design of the neck part of the reactor and cross-flow impingement of the streams, which enhance the turbulence of the mixing streams and quicken the mixing process. By using the disclosed mixer-reactor, the mole ratio of solvent and phosgene to amines could be reduced significantly.

It can be seen from the above description that good mixing efficiency could be achieved by injecting one fluid stream into another stream in cross-flow manner through a plurality of holes arranged around a pipe. However, the injected stream can only reach a certain depth of the main fluid stream because of the resistance of the fluids, i.e. excellent mixing efficiency can be achieved only in the case of small pipe, which restrict the scale of the plant. In detail, the injected stream from the holes could not reach the center of the mixing pipe immediately when the diameter of the mixing pipe is large enough. So it will take long distance or long time for the joined stream to mix into the main stream when the scale of the plant is large. Therefore, there is a demand for the design of the mixer-reactor with excellent mixing performance for the initial mixing of the reactants in large-scale plant.

SUMMARY OF THE INVENTION

The object of the invention is to provide a novel design of hole-jetting type mixer-reactor, which can mix two reactant streams instantaneously in large scale so as to inhibit the side reactions and increase the yields and selectivity of the target products.

The mixer-reactor provided according to the present invention is based on the following design concept: two fluids streams, such as gas to gas or liquid to liquid, are mixed crossly by jetting through multi-holes. One of the fluid streams (stream A) flows in a platode pipe with rectangular or rectangle-like cross section, on which a series of jet holes are arranged uniformly. The other fluid stream (stream B) is split into multiple streams through the said jet holes and injected into stream A in the platode pipe crossly at a certain angle. Since the flow channel for stream A is designed as a platode pipe, stream B can be dispersed into stream A very quickly, thereby the mixing process of the two streams in large scale could be expedited.

The hole-jetting type mixer-reactor provided according to the present invention comprises the following parts: a first feeding port $1a$, a second feeding port $1b$, an outer casing 2, an inner casing 4, jet holes 5 and a mixing reaction zone 6; the inner casing 4 is inside the outer casing 2, and the lower portion of the outer casing 2 forms a buffer chamber 3 with the inner casing 4; the first feeding port $1a$ connects with the inner casing 4, which forms a main flow channel; the second feeding port $1b$ connects with the buffer chamber 3; the jet holes 5 are on the wall of the inner casing 4 and at the lower portion of the buffer chamber 3; the mixing reaction zone 6 is located inside the inner casing 4 below the jet holes 5; the cross section of the inner casing 4 is rectangular or rectangle-like.

In the mixer-reactor according to the present invention, the cross section of the inner casing 4 means such a cross section which is perpendicular to the flow direction in the inner casing 4, and it may be designed as a rectangle or rectangle-like form, such as a rectangle with its four right-angle being rounded, or a rectangle-like shape having a rectangular central portion and two curved or trapezoidal side portions. In addition, the cross section of the inner casing 4 may be designed as other shapes suitable for the mixing of fluids, such as a butterfly shape or a spindle shape.

In the mixer-reactor according to the present invention, the perpendicular distance $l_1$ between two long sides of the cross section and the length $l_2$ of two long sides should be determined according to the physo-chemical properties of stream A, velocity and flow rate of the stream in the inner casing 4. For example, $l_1$ may be in the range of 5-50 mm, preferably of 8-30 mm. The length $l_2$ should be greater than $l_1$ and be determined according to the physo-chemical properties of stream B, velocity and flow rate of stream B. The design of $l_1$ and $l_2$ should make the stream B through the jet holes reach the center of stream A in the platode pipe as soon as possible.

In the mixer-reactor according to the present invention, the shape of the jet holes 5 on the wall of the inner casing 4 is not limited specifically. For example, it can be designed as the shape of circle, ellipse, square, rectangle, rhombus, and so on. The specific size and number of the jet holes should be determined according to the required flow rate and velocity of stream B passing through the jet holes. For example, when the jet holes 5 are in circular shape, the diameter $d_1$ of the jet holes 5 may be 0.5-15 mm, preferably 2-10 mm. When the jet holes 5 are in the shape of square, the side length $d_1$ of the square-shaped holes may be 0.5-15 mm, preferably 2-10 mm. When the jet holes 5 are ellipse- or rectangle-like, the length $d_1$ of the major axis of ellipse-shaped holes or that of the long side of rectangle-shaped holes may be 0.5-15 mm, preferably 2-10 mm, and the ratio of long side to short side or the ratio of major axis to minor axis may be 1-10:1, preferably 1-4:1. In the present invention, for a convenience of description, the structural parameter $d_1$ of the jet holes is referred to as their equivalent diameter when the jet holes are designed as different shapes.

In the mixer-reactor according to the present invention, the axial direction of the jet holes 5 has an included angle $\beta$ in the range of 0-70°, preferably of 0-45° with the plane which is perpendicular to the streamwise direction in the inner casing 4. It is preferable that the jet holes are arranged on the pipe wall of the inner casing 4 at the same horizontal plane, i.e. the distances from each jet hole to the outlet of the mixing reaction zone 6 are equal. The distance $d_2$ between two adjacent jet holes follows the following relationship, that is $d_2/d_1=1.1-8$, preferably $d_2/d_1=1.5-3$. The jet holes on the two long sides of the cross section of the inner casing 4 are arranged oppositely or staggeringly. The number of the jet holes on the inner casing 4 of the mixer-reactor could be 2-100, preferably 4-60.

In the mixer-reactor according to the present invention, the parameter $h_1$, which is the distance between the center of jet hole 5 and the outlet of the mixing reaction zone 6, is determined according to the residence time t of the reactant streams A and B in the mixing reaction zone, specifically as follows:

$$h_1 = u_{A+B} \times t$$

wherein,
$u_{A+B}$ is the average velocity of mixing stream, t is the residence time of the mixing reactant stream in the mixing reaction zone. After being mixed, the two reactant streams are combined into one mixing stream, and the residence time is estimated based on the mixing stream.

In the mixer-reactor according to the present invention, the structural parameters of the reactor, such as the dimensions of the cross section of the inner casing, the size and the number of the jet holes 5, are determined specifically according to the following equation:

$$1 \leq u_B/u_A = \frac{Q_B/(n \cdot S_h)}{Q_A/S_A} \leq 20$$

wherein,
$u_A$ is the velocity of stream A within the inner casing before mixing with stream B, m/s.
$u_B$ is the velocity of stream B passing through the jet holes, m/s.
$Q_A$ and $Q_B$ are the flow rates of stream A and stream B, respectively, m³/h.
$S_A$ is the inside sectional area of the inner casing 4, m².
n is the number of jet holes;
$S_h$ is the cross sectional area of jet holes, m².

The ratio of $u_B/u_A$ is preferably 2-16, further preferably 3-10. When both stream A and stream B are liquids with their viscosities less than 200 mPa·S, the velocity of stream A, $u_A$ should be 1-40 m/s, preferably 3-20 m/s. Otherwise when the streams are gases, $u_A$ should be 2-150 m/s, preferably 5-40 m/s.

The mixer-reactor according to the present invention does not have a limitation on the number of feeding ports. It may have two feeding ports which connect with the inner casing and the buffer chamber, respectively, or it may have more than two feeding ports according to specific applications or uses. For example, two feeding ports may be configured to connect with the buffer chamber separately so that different raw materials can be introduced through different feeding ports.

In the mixer-reactor according to the present invention, a buffer pipe is preferably configured between the first feeding port $1a$ and the inner casing to make the stream A flow in the fully-developed turbulent state before mixing with stream B. The structural dimensions of the buffer section are not limited particularly in the invention, and they may be determined according to the physical properties and flow patterns of the stream.

Similarly, the other structural dimensions of the mixer-reactor according to the present invention, such as the connection between the inner casing and the outer casing, the ratios of the length of the inner casing to the length of the mixing reaction zone, and so on, may be designed by the skilled person in the relative field without inventive work.

Compared with the prior fast mixing equipment, the hole-jetting type mixer-reactor according to the present invention has the following advantages:

(1) Two streams impinge into each other crossly and then are mixed in a platode pipe with a rectangular or rectangle-like cross section, as described in the invention, and the time scale of the mixing process is several milliseconds.
(2) The mixer-reactor of the present invention could be used for the fast mixing of two fluids, such as gas vs. gas, or liquid vs. liquid. Compared with the conventional hole-jetting tubular mixer (or reactor) with a circular cross section, the present mixer-reactor with a platode pipe could be scaled up easily and used for the production of some special product in large scale (during the process fast competing reactions always occurs).
(3) In the mixing zone of the mixer-reactor, the mixed stream flows in "plug flow" pattern with the minimized back-mixing.
(4) In the present invention, the length of the mixing reaction zone could be changed to match different reaction time scale.

EMBODIMENTS OF THE INVENTION

The mixer-reactor of the present invention will be described in detail with the accompanying drawings but not limited to these embodiments.

Figure 3:
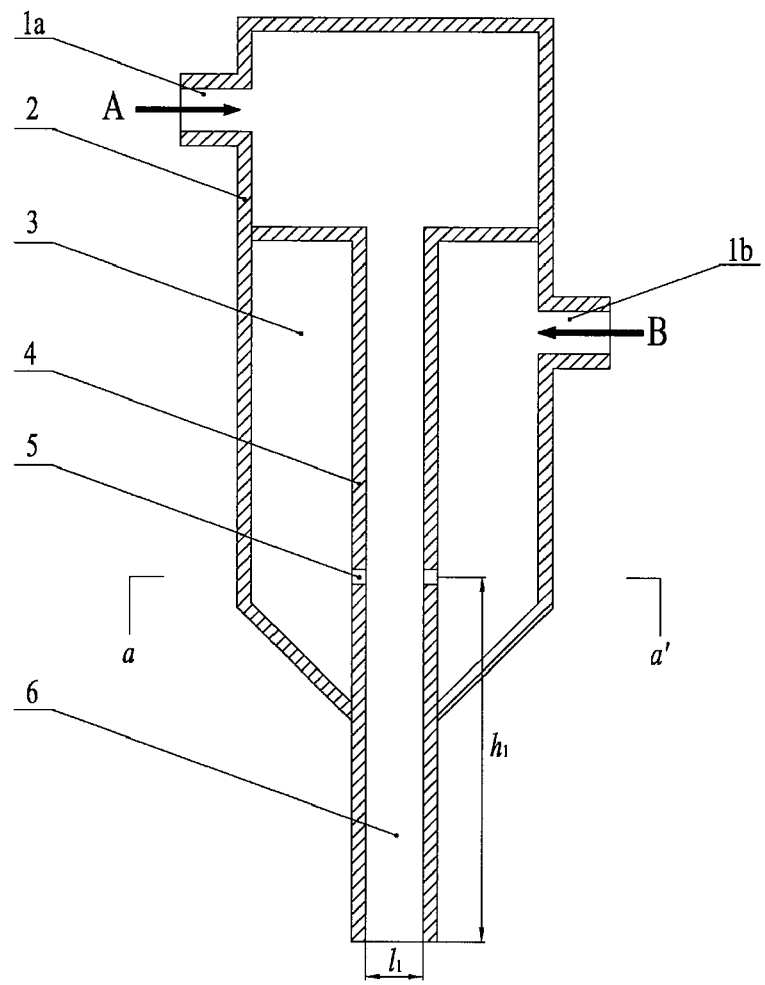
FIG. 3 is a schematic drawing of the mixer-reactor according to one embodiment of the present invention.
Figure 6:
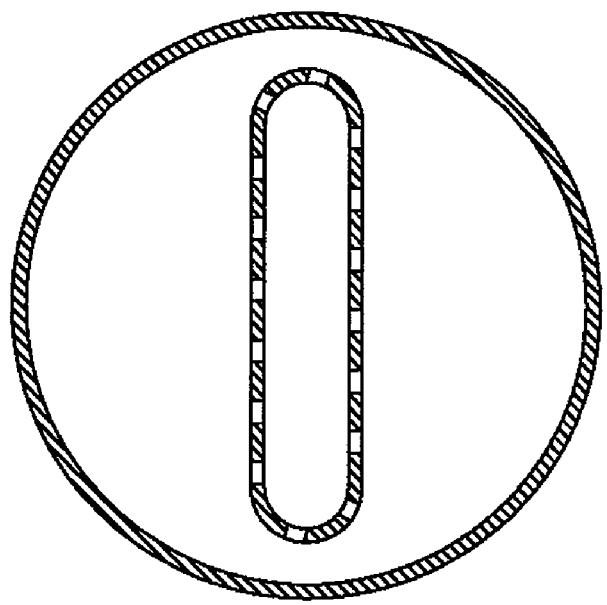
FIG. 6 shows the distribution of jet holes according to another embodiment of the mixer-reactor in the invention.
Figure 7:
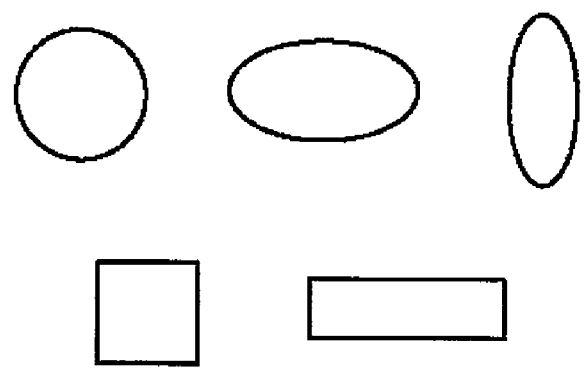
FIG. 7 shows various types of jet holes to be used in the mixer-reactor according to the present invention.
Figure 8:
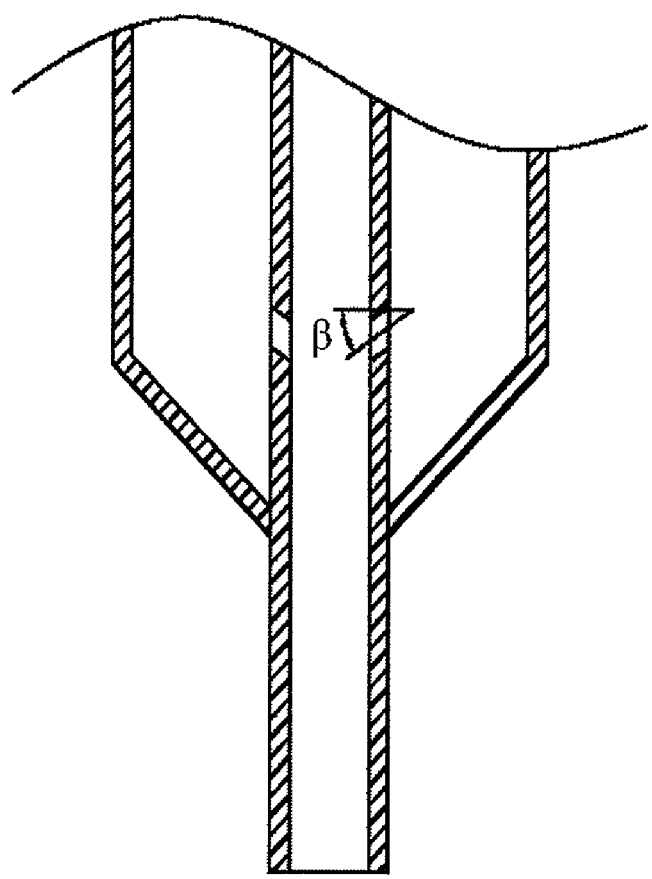
FIG. 8 is a schematic drawing of the direction of the jet holes according to the present invention.

As shown in FIG. 3, the hole-jetting type mixer-reactor mainly comprises the following parts: a first feeding ports $1a$, a second feeding port $1b$, an outer casing 2, a buffer chamber 3, an inner casing 4, jet holes 5 and a mixing reaction zone 6. The lower portion of the outer casing 2 forms a buffer chamber 3 with the inner casing 4. The first feeding port $1a$ connects with the inner casing to form one flow channel, and the second feeding port $1b$ connects with the buffer chamber 3 to form the other flow channel. The jet holes 5 are arranged around the wall of the inner casing 4 and at the lower portion of the buffer chamber 3. The inner casing is a platode pipe with a rectangular or rectangle-like cross section. The mixing reaction zone is at the downstream of the inner casing below the jet holes. For the present invention, the distances between each jet hole and the outlet of the mixing reaction zone are equal preferably. Furthermore, the jet holes are stagger to the holes on the other side of the inner casing preferably as shown in FIG. 6. The axial direction of the jet holes may be perpendicular to the wall of the inner casing or forming an acute angle with the plane which is perpendicular to the streamwise direction of the inner casing.

The mixer-reactor as shown in FIG. 3 may be operated in the following method: two reactant streams A and B are introduced into the inner casing 4 and the buffer chamber 3 of the reactor through the first feeding port $1a$ and the second feeding port $1b$, respectively, and then flow down along the inner casing and the buffer chamber. Stream B is distributed uniformly in the buffer chamber and then injected into the stream A crossly in the platode portion of the inner casing through the jet holes 5. The two streams continue to mix and react with each other in the following portion of the inner casing (reaction zone 6). Generally, the time scale of the mixing process is several milliseconds, which benefits from the cross-flow impingement through the multiple-holes. As the reaction zone is designed as plug flow reactor, the back mixing of the mixed stream is minimized. At the outlet of the reaction zone 6, reaction products are collected and then separated to obtain the objective product.

The mixer-reactor of the present invention will be illustrated with the following examples which, however, should not be construed as the limitation to the present invention in any way.

The laser induced fluorescence (LIF) technology is an advanced experimental method for a quantitative evaluation on the mixing efficiency of streams. In this experiment some fluorescent materials (such as Rhodamine B, Rhodamine 6G, acetone, etc.) could be used as fluorescent tracer. When the tracer is excited by the laser light, an emission spectrum will be sent out. The emitted fluorescence is separated from the laser light by a high-pass optical filter, and then captured by CCD camera with high resolution. When the concentration of the tracer is below a certain value, the concentration of the tracer will have a linear relationship with the grey value of the corresponding pixel. Accordingly, the distribution of the fluorescence intensity in the measurement plane can be converted to the tracer concentration distribution, which represents the mixing process. This experimental technique has been used to evaluate the mixing process of the hole-jetting type mixer-reactor according to the present invention. For the liquid mixing process, Rhodamine B is used as fluorescent tracer and the wavelength of the laser is 532 nm. For the gas mixing process, acetone is used as fluorescent tracer and the wavelength of the laser is 266 nm. The resolution of the high-speed digital camera used in the experiments is 1280×1024 pixels.

Example 1

Figure 4:
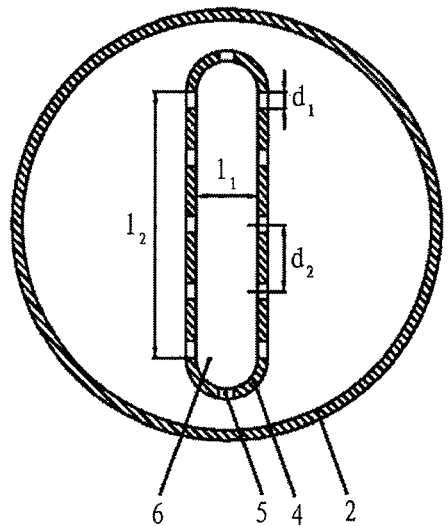
FIG. 4 shows the cutaway view of a-a' of the mixer-reactor in FIG. 3.
Figure 5:
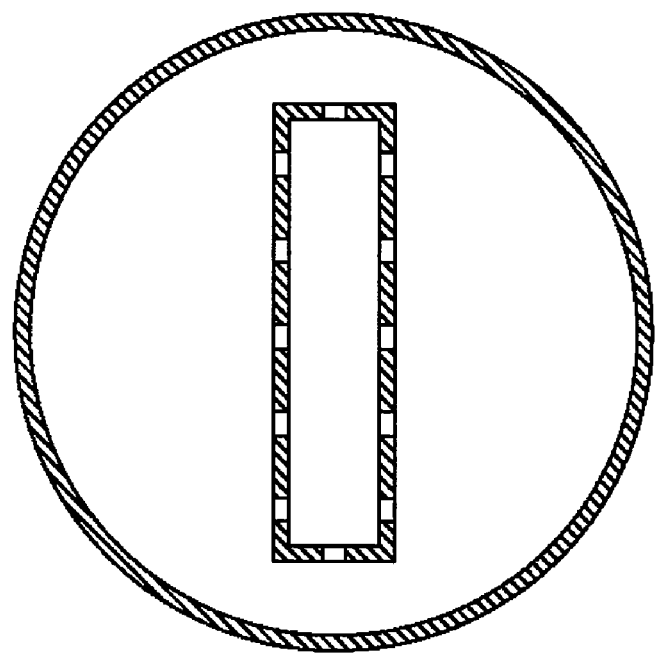
FIG. 5 shows the cross section of the inner casing according to another embodiment of the mixer-reactor in the invention.

The hole-jetting type mixer-reactor according to the present invention as shown in FIG. 3 is used, in which the long side length $l_2$ of the cross section of the inner casing is 100 mm and the width $l_1$ is 18 mm, the configuration of the cross section of the inner casing is shown in FIG. 4. The inner diameter of the outer casing is 160 mm. The jet holes are in circular form with a diameter of 5 mm. The number of the jet holes is 22. The axial direction of the jet holes is perpendicular to the wall of the inner casing. The height $h_1$ between the center of the jet holes and the outlet of the mixing reaction zone is 100 mm. And the jet holes are arranged opposite to each other (as shown in FIG. 4). The tracer Rhodamine B is injected continuously with a concentration of 100 μg/L at the upstream of the feeding pipe which is connected to the feeding port 1b (the liquid feeding pipe has an enough length in order to make the tracer blend with the stream fully before entering the feeding port). The gauge pressure at the feeding port 1b is 3.5 kg/cm². The flow rate of the tracer solution is 25 m³/hr. Tap water is introduced into the feeding port 1a with a constant rate of 30 m³/hr. The gauge pressure at the feeding port 1a is 3.5 kg/cm². The LIF technology is used to evaluate the mixing efficiency of two solutions with and without tracer Rhodamine B. The intensity of segregation (represented as IOS, i.e. the IOS has the value of 0.0 when the mixing process finished, and 1.0 when the segregation of two fluids is complete, that is, the tracer concentration at each pixel is 0 or 1) of mixing stream at different sections in the mixing reaction zone is used to evaluate the mixing extent of the mixing process. Here, the mixing process is considered to be completed when the IOS has the value of 5%, i.e., two streams mix to 95% uniformity. Accordingly, the time which it takes to mix to 95% uniformity for two streams is called 95% mixing time. By using the LIF experiment, the mixing distance is 53 mm (calculating from the contact point of the two streams), and the 95% mixing time is about 7.1 ms.

With the same mixer-reactor, if the flow rate of the water with the tracer at the feeding port 1b is 50 m³/hr and the flow rate of the water at the feeding port 1a is 60 m³/hr, the mixing distance is 62 mm, and the 95% mixing time is about 4.2 ms.

Comparative Example 1

Figure 1:
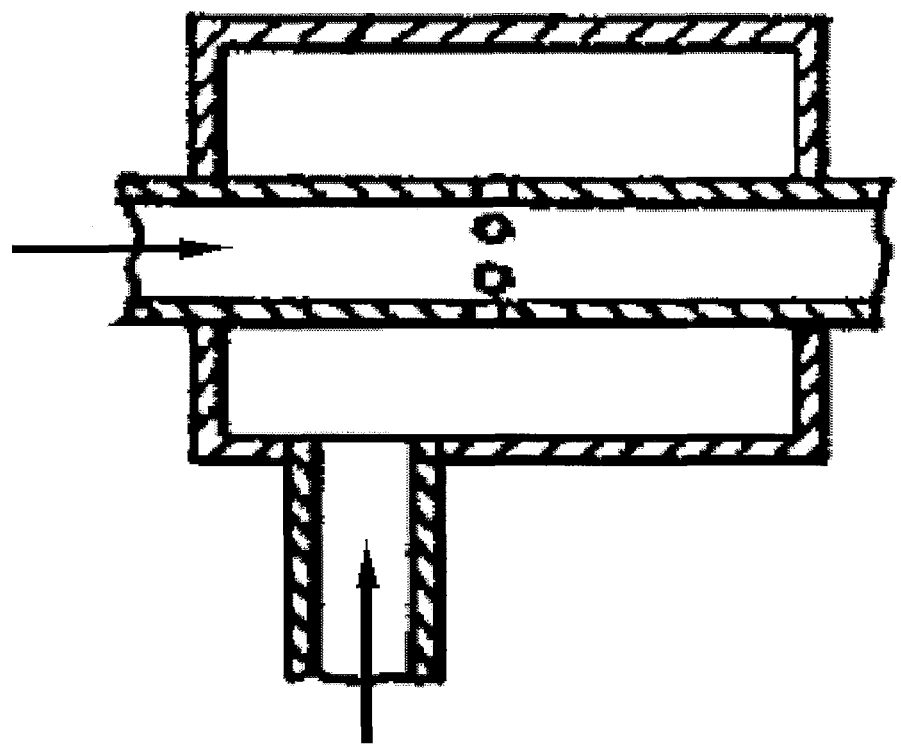
FIG. 1 is a schematic drawing of the reactor disclosed in U.S. Pat. No. 3,226,410.
Figure 2:
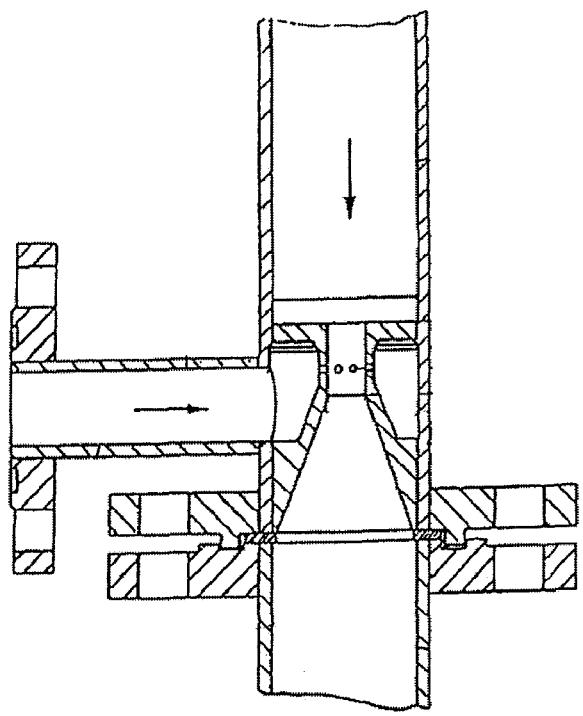
FIG. 2 is a schematic drawing of the reactor disclosed in U.S. Pat. No. 5,117,048.

A hole-jetting type mixer-reactor as shown in FIG. 1 is used, in which, the cross section of the inner casing is in a circular shape, and the area of the circular section is the same large as to that of the inner casing in the example 1. Other structural dimensions of the reactor, the distribution of the jet holes, the flow rates of the experimental streams, the feeding manner, etc. are identical with those mentioned in the example 1. Similarly, the laser induced fluorescence technology is used to evaluate the mixing process of two aqueous solutions with and without the tracer Rhodamine B. When the flow rate of the water with the tracer is 25 m³/hr and the flow rate of the tap water is 30 m³/hr, the mixing distance to mix to 95% uniformity is 285 mm, and the 95% mixing time is about 38.1 ms.

Example 2

The hole-jetting type mixer-reactor according to the present invention as shown in FIG. 3 is used, in which, the length $l_2$ of the long side of the cross section of the inner casing is 120 mm and the width $l_1$ of the cross section is 20 mm, the configuration of the cross section of the inner casing is shown in FIG. 6. The inner diameter of the outer casing is 200 mm. The jet holes are in a circular shape with a diameter of 6 mm. The number of the jet holes is 22. The acute angle β between the central axis of the jet holes and the plane which is perpendicular to the streamwise direction is of 5°. The height between the center of the jet holes and the outlet of the mixing reaction zone is 200 mm. The jet holes are stagger to the holes on the other side of the inner casing (as shown in FIG. 6). Acetone vapor is used as the tracer and is injected continuously into stream B (air) at the upstream of the gas feeding pipe which is connected to the feeding port 1b (the gas feeding pipe has an enough length in order to make the tracer blend with the stream fully before entering the feeding port). The air pressure at the feeding port 1b is 1.2 kg/cm² (gauge pressure). The flow rate of the air stream with the tracer is 80 m³/hr (standard condition) at the feeding port 1b. Air without the tracer is introduced into the feeding port 1a at a constant rate of 120 m³/hr (standard condition). The air pressure at feeding port 1a is 1.2 kg/cm² (gauge pressure). The laser induced fluorescence technology is used to evaluate the mixing efficiency of two air streams with and without tracer acetone. When achieving 95% uniformity for two gas streams, the mixing distance is 42 mm with corresponding 95% mixing time 2.1 ms.

Comparative Example 2

A hole-jetting type mixer-reactor as shown in FIG. 1 is used, in which, the cross section of the inner casing is in a circular shape, and the area of the circular section is the same large as to that of the inner casing in the example 2. Other structural dimensions of the reactor, the distribution of the jet holes, the flow rates of the experimental streams, the feeding manner, etc. are identical with those mentioned in the example 2. Similarly, the laser induced fluorescence technology is used to evaluate the mixing process of two air streams with and without the tracer acetone. When the flow rate of the air stream with the tracer is 80 m³/hr (standard condition) and the flow rate of the air stream without the tracer is 120 m³/hr (standard condition), the mixing distance to mix to 95% uniformity is 248 mm, and the 95% mixing time is about 12.4 ms.

Example 3

In a process for producing polymethylene polyphenyl isocyanate (polymeric MDI), the initial mixing of the raw materials polymethylene polyphenyl polyamine and phosgene has a great effect on the quality and yield of the final product (pMDI). Generally, the mixing time scale of two reactant streams should be at millisecond level so as to inhibit the side reactions and to increase the yield of the target product.

The hole-jetting type mixer-reactor according to the present invention as shown in FIG. 3 is used for producing the polymeric MDI, in which, the length 12 of the long side of the cross section of the inner casing is 100 mm and the width 11 of the cross section is 12 mm. The cross section of the inner casing is shown in FIG. 6. The inner diameter of the outer casing is 200 mm. The jet holes are in a circular shape with a diameter of 6 mm. The number of the jet holes is 24. The axial direction of the jet holes is perpendicular to the wall of the inner casing. The height between the center of the jet holes and the outlet of the mixing reaction zone is 300 mm. The jet holes are stagger to the holes on the other side of the inner casing (as shown in FIG. 6). Polymethylene polyphenyl polyamine at a flow rate of 12,000 kg/hr and chlorobenzene at a flow rate of 40,000 kg/hr are mixed and then introduced continuously through the feeding port 1b, and the phosgene solution (chlorobenzene as the solvent, concentration of phosgene is 50% by weight) at a flow rate of 48,000 kg/hr is introduced continuously through the feeding port 1a. The reaction mixture are collected at the outlet of the mixer-reactor and then continue the following reactions in four stirred tanks in series, which have the temperature of 90° C., 105° C., 115° C. and 120° C., respectively. The volume of each tank is 40 m³. The mixture with the products, phosgene, and solvent is then separated in a series of packed towers. The yield of polymeric MDI is 98.1 wt %.

Example 4

The hole-jetting type mixer-reactor according to the present invention as shown in FIG. 3 is used for producing the polymeric MDI, in which, the length 12 of the long side of the cross section of the inner casing is 200 mm and the width 11 of the cross section is 10 mm. The cross section of the inner casing is shown in FIG. 6. The inner diameter of the outer casing is 280 mm. The jet holes are in a circular shape with a diameter of 4 mm. The number of the jet holes is 52. The acute angle β between the central axis of the jet holes and the plane which is perpendicular to the streamwise direction is 10°. The height between the center of the jet holes and the outlet of the mixing reaction zone is 300 mm. The jet holes are stagger to the holes on the other side of the inner casing (as shown in FIG. 6). Polymethylene polyphenyl polyamine at a flow rate of 16,000 kg/hr and chlorobenzene at a flow rate of 48,000 kg/hr are mixed and then introduced continuously through the feeding port 1b, and the phosgene solution (chlorobenzene as the solvent, concentration of phosgene is 50% by weight) at a flow rate of 60,000 kg/hr is introduced continuously through the feeding port 1a. The reaction mixture are collected at the outlet of the mixer-reactor and then continue the following reactions in four stirred tanks in series, which have the temperature of 90° C., 105° C., 115° C. and 120° C., respectively. The volume of each tank is 50 m³. The mixture with the products, phosgene, and solvent is then separated in a series of packed towers. The yield of polymeric MDI is 98.3 wt %.

What is claimed is:

1. A hole-jetting type mixer-reactor, comprising the following parts: a first feeding port and a second feeding port, an outer casing, an inner casing, jet holes and a mixing reaction zone; the inner casing is inside the outer casing, and the lower portion of the outer casing forms a buffer chamber with the inner casing; the first feeding port connects with the inner casing to form one flow channel, and the second feeding port connects with the buffer chamber to form the other flow channel; the jet holes are on the wall of the inner casing which is located at the lower portion of the buffer chamber; the mixing reaction zone is located inside the inner casing below the jet holes; the inner casing is a platode pipe with rectangular or rectangle-like cross section, the said rectangle-like cross section is a rectangle with four right-angled corners being rounded or a rectangle-like plane with a rectangular central portion and two arcuate side portions, and the length $l_2$ of two long sides of the said cross section is greater than the perpendicular distance $l_1$ between the two long sides, wherein the perpendicular distance $l_1$ between the two long sides of the cross section of the inner casing is 5-50 mm, and the inside sectional area of the inner casing $S_A$ satisfies the following relationship $$1 \leq u_B/u_A = \frac{Q_B/(n \cdot S_h)}{Q_A/S_A} \leq 20$$

wherein, $u_A$ is the flow rate of stream A in the platode channel before mixing, m/s;
$u_B$ is the flow rate of stream B passing through the jet holes, m/s;
$Q_A$ and $Q_B$ are the volume flow rates of stream A and B, respectively, m³/h;
$S_A$ is the inside sectional area of the inner casing, m²;
n is the number of jet holes;
$S_h$ is the cross sectional area of each jet hole, m²;
when both stream A and stream B are liquids with their viscosities less than 200 mPa·S, the velocity of stream A, $u_A$ is 1-40 m/s; otherwise when the streams are gases, $u_A$ is 2-150 m/s.

2. The mixer-reactor according to claim 1, wherein the perpendicular distance $l_1$ between the two long sides is 8-30 mm, and the length $l_2$ of the two long sides satisfies the following relationship: $3 \leq u_B/u_A \leq 10$; when both stream A and stream B are liquids with their viscosities less than 200 mPa·S, the velocity of stream A, $u_A$ is 3-20 m/s; otherwise when the streams are gases, $u_A$ is 5-40 m/s.

3. The mixer-reactor according to claim 2, wherein the shape of the jet holes is one selected from the group consisting of a circle, ellipse, square, rectangle, and rhombus; the axial direction of the jet holes has an included angle β of 0-70° with the plane which is perpendicular to the streamwise direction in the inner casing.

4. The mixer-reactor according to claim 3, wherein the included angle β is 0-45°.

5. The mixer-reactor according to claim 4, wherein the jet holes are arranged on the wall of the inner casing at the same horizontal line, and the distances from each jet hole to the outlet of the mixing reaction zone are equal; the relationship of the distance $d_2$ between two adjacent jet holes and the equivalent diameter $d_1$ of the jet holes is $1.1 \leq d_2/d_1 \leq 8$; the jet holes on two long sides are arranged oppositely or stagger to each other.

6. The mixer-reactor according to claim 5, wherein the relationship of the distance $d_2$ between two adjacent jet holes and the equivalent diameter $d_1$ of the jet hole is $1.5 \leq d_2/d_1 \leq 3$.

* * * * *